US010791470B2

(12) United States Patent
Benjebbour et al.

(10) Patent No.: US 10,791,470 B2
(45) Date of Patent: *Sep. 29, 2020

(54) RADIO COMMUNICATION METHOD, RADIO BASE STATION AND RADIO COMMUNICATION SYSTEM

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,698

(22) Filed: Oct. 13, 2017

(65) Prior Publication Data

US 2018/0049044 A1   Feb. 15, 2018

Related U.S. Application Data

(63) Continuation of application No. 14/395,867, filed as application No. PCT/JP2013/061068 on Apr. 12, 2013, now Pat. No. 9,820,165.

(30) Foreign Application Priority Data

Apr. 27, 2012  (JP) .................................. 2012-102933

(51) Int. Cl.
*H04W 16/28*  (2009.01)
*H04B 7/06*  (2006.01)
(Continued)

(52) U.S. Cl.
CPC .......... *H04W 16/28* (2013.01); *H04B 7/0617* (2013.01); *H04B 7/0639* (2013.01);
(Continued)

(58) Field of Classification Search
None
See application file for complete search history.

(56) References Cited

U.S. PATENT DOCUMENTS 8,743,724 B2   6/2014 Kwon et al.
2010/0062723 A1   3/2010 Tao et al.
(Continued)

FOREIGN PATENT DOCUMENTS

WO   2010/137917 A2   12/2010
WO   2011/056770 A1   5/2011

OTHER PUBLICATIONS

International Search Report for corresponding International Application No. PCT/JP2013/061068, dated Jul. 16, 2013 (1 page).
(Continued)

*Primary Examiner* — Hassan A Phillips
*Assistant Examiner* — Gautam Sharma

(57) ABSTRACT

The present invention is designed to shorten the time that a user terminal takes to detect the common control/reference signals while coverage of the common control/reference signals transmitted from a small base station is secured. As the radio communication method of the invention, a radio communication method is provided in which beam forming information for forming transmission beams directed from the small base station to the user terminal are generated based on position-related information of the user terminal acquired by communication between the macro base station and the user terminal using a coverage carrier and position-related information of the small base station, and the small base station precodes at least one of a common control signal and a reference signal that are common in a small cell based on the beam forming information and transmits the precoded signal from a plurality of transmitting antennas using a capacity carrier.

2 Claims, 15 Drawing Sheets

(51) Int. Cl.
    *H04W 72/04*     (2009.01)
    *H04W 64/00*     (2009.01)
    *H04W 16/32*     (2009.01)
    *H04L 5/00*      (2006.01)

(52) U.S. Cl.
    CPC .......... *H04L 5/0048* (2013.01); *H04W 16/32* (2013.01); *H04W 64/00* (2013.01); *H04W 72/046* (2013.01); *H04W 72/0406* (2013.01); *H04W 72/048* (2013.01)

(56) References Cited

U.S. PATENT DOCUMENTS

| | | | |
|---|---|---|---|
| 2010/0290430 A1* | 11/2010 | Lee | H04W 36/385 370/331 |
| 2011/0098055 A1 | 4/2011 | Kwon et al. | |
| 2011/0105132 A1 | 5/2011 | Vasudevan et al. | |
| 2012/0076039 A1 | 3/2012 | Kwon et al. | |
| 2013/0183979 A1* | 7/2013 | Chen | H04W 36/30 455/436 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).
Office Action issued in corresponding Japanese Application No. 2012-102933, dated Mar. 29, 2016 (4 pages).
Extended European Search Report issued in corresponding European Application No. 13782511.3, dated Nov. 26, 2015 (8 pages).
Extended European Search Report in counterpart European Application No. 19193567.5 dated Nov. 18, 2019 (8 pages).

* cited by examiner

|  | MACRO CELL (WIDE AREA) | SMALL CELL (LOCAL AREA) |
|---|---|---|
| SPECTRUM EFFICIENCY | VERY IMPORTANT (LIMITED BW) | IMPORTANT (MAY NOT BE CRITICAL IF LARGE BW AVAILABLE) |
| MOBILITY | MEDIUM-TO-HIGH | LOW |
| COVERAGE | ESSENTIAL | WIDER IS BETTER |
| DL/UL RADIO LINKS | ASYMMETRIC | MORE SYMMETRIC |
| TRAFFIC LOAD | MORE UNIFORM (MANY USERS & CELL PLANNING) | MORE FLUCTUATED (LESS USERS & NON-UNIFORM DEPLOYMENTS) |

FIG.5

INTERVAL OF ANTENNA ELEMENTS ($\lambda/2$) BECOMES HALF
THE NUMBER OF ARRANGABLE ELEMENTS BECOMES
DOUBLE WITH THE SAME ANTENNA LENGTH

RADIO COMMUNICATION METHOD, RADIO BASE STATION AND RADIO COMMUNICATION SYSTEM

CROSS-REFERENCE TO RELATED APPLICATIONS

The present application is a continuation application and, thereby, claims benefit under 35 U.S.C. § 120 to U.S. patent application Ser. No. 14/395,867 filed on Oct. 21, 2014, titled, "RADIO COMMUNICATION METHOD, RADIO BASE STATION AND RADIO COMMUNICATION SYSTEM," which is a national stage application of PCT Application No. PCT/JP2013/061068, filed on Apr. 12, 2013, which claims priority to Japanese Patent Application No. 2012-102933 filed on Apr. 27, 2012. The contents of the priority applications are incorporated by reference in their entirety.

TECHNICAL FIELD

The present invention relates to a radio communication method, a radio base station and a radio communication system in a next-generation mobile communication system in which a macro cell and a small cell are arranged to geographically overlap.

BACKGROUND ART

In a UMTS (Universal Mobile Telecommunications System) network, LTE (Long Term Evolution) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Also, successor systems of LTE (referred to as, for example, "LTE-Advanced" or "LTE enhancement" (hereinafter referred to as "LTE-A")) are under study for the purpose of achieving further broadbandization and increased speed beyond LTE. In LTE-A (Rel-10), carrier aggregation to group a plurality of component carriers (CCs), where the system band of the LTE system is one unit, for broadbandization, is used. Also, in LTE-A, a HetNet (Heterogeneous Network) configuration to use an interference coordination technique (eICIC: enhanced Inter-Cell Interference Coordination) is under study.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, in cellular systems such as W-CDMA, LTE (Rel. 8), and successor systems of LTE (for example, Rel. 9 and Rel. 10), radio communication schemes (radio interfaces) that are suitable for macro cells are designed. In the future, it is expected that such a macro cell and many small cells that provide high-speed wireless services in local coverage will be geographically overlap. Consequently, there is a demand to design radio communication schemes suitable for communication in small cells that are arranged to geographically overlap with a macro cell, so that capacity can be secured with the small cells while coverage is secured with the macro cell.

The present invention has been made in view of the above, and it is therefore an object of the present invention to provide a radio communication method, a radio base station and a radio communication system suitable for communication in small cells that are arranged to geographically overlap with a macro cell.

Solution to Problem

The radio communication according to the present invention is a radio communication method to allow a user terminal that communicates with a macro base station forming a macro cell, using a first carrier, to communicate with a small base station forming a small cell that is smaller than the macro cell, using a second carrier of a higher frequency band than the first carrier, the radio communication method comprising the steps of: generating beam forming information for forming a transmission beam directed from the small base station to the user terminal, based on position-related information of the user terminal acquired by communication between the macro base station and the user terminal using the first carrier; and in the small base station, precoding at least one of a common control signal and a reference signal that are common in the small cell, based on the beam forming information, and transmitting the precoded signal from a plurality of transmitting antennas using the second carrier.

The radio base station according to the present invention is a radio base station which forms a small cell that is smaller than a macro cell, and which communicates with a user terminal using a second carrier of a higher frequency band than a first carrier, which the user terminal uses to communicate with a macro base station forming the macro cell, the radio base station comprising: a precoding section configured to precode at least one of a common control signal and a reference signal that are common in the small cell, based on beam forming information for forming a transmission beam directed to the user terminal; and a plurality of transmitting antennas that transmit at least one of the precoded common control signal and the precoded reference signal using the second carrier, wherein the beam forming information is generated based on position-related information of the user terminal acquired by communication between the macro base station and the user terminal using the first carrier.

The radio base station according to the present invention is a radio base station which communicates with a user terminal using a first carrier, and which connects with a small base station which communicates with the user terminal using a second carrier of a higher frequency band than the first carrier, the radio base station comprising: an acquisition section configured to acquire position-related information of the user terminal by communication with the user terminal using the first carrier; and a reporting section configured to report the position-related information of the user terminal acquired by the acquisition section, or generated beam forming information for forming a transmission beam directed from the small base station to the user terminal based on the position-related information of the user terminal.

The radio communication system according to the present invention is a radio communication system to allow a user terminal that communicates with a macro base station forming a macro cell, using a first carrier, to communicate with a small base station forming a small cell that is smaller than the macro cell, using a second carrier of a higher frequency band than the first carrier, wherein: beam forming information for forming a transmission beam directed from the small base station to the user terminal is generated based on position-related information of the user terminal acquired by communication between the macro base station and the user terminal using the first carrier; and the small base station precodes at least one of a common control signal and a reference signal that are common in the small cell, based on the beam forming information, and transmits the precoded signal from a plurality of transmitting antennas using the second carrier.

Advantageous Effects of Invention

According to the present invention, it is possible to provide a radio communication method, a radio base station and a radio communication system suitable for communication in small cells that are arranged to geographically overlap with a macro cell. In particular, the radio base station to form the small cell, assisted by the radio base station to form the macro cell, form transmission beams directed to the rough position of the user terminal, and transmit common control/reference signals that are common in the small cell by using the transmission beams, so that it is possible to shorten the time the user terminal takes to detect the common control/reference signals while coverage of the common control/reference signals is secured.

BRIEF DESCRIPTION OF DRAWINGS

FIG. 5 shows a table to list differences between a macro cell and a small cell;

DESCRIPTION OF EMBODIMENTS

Figure 1:
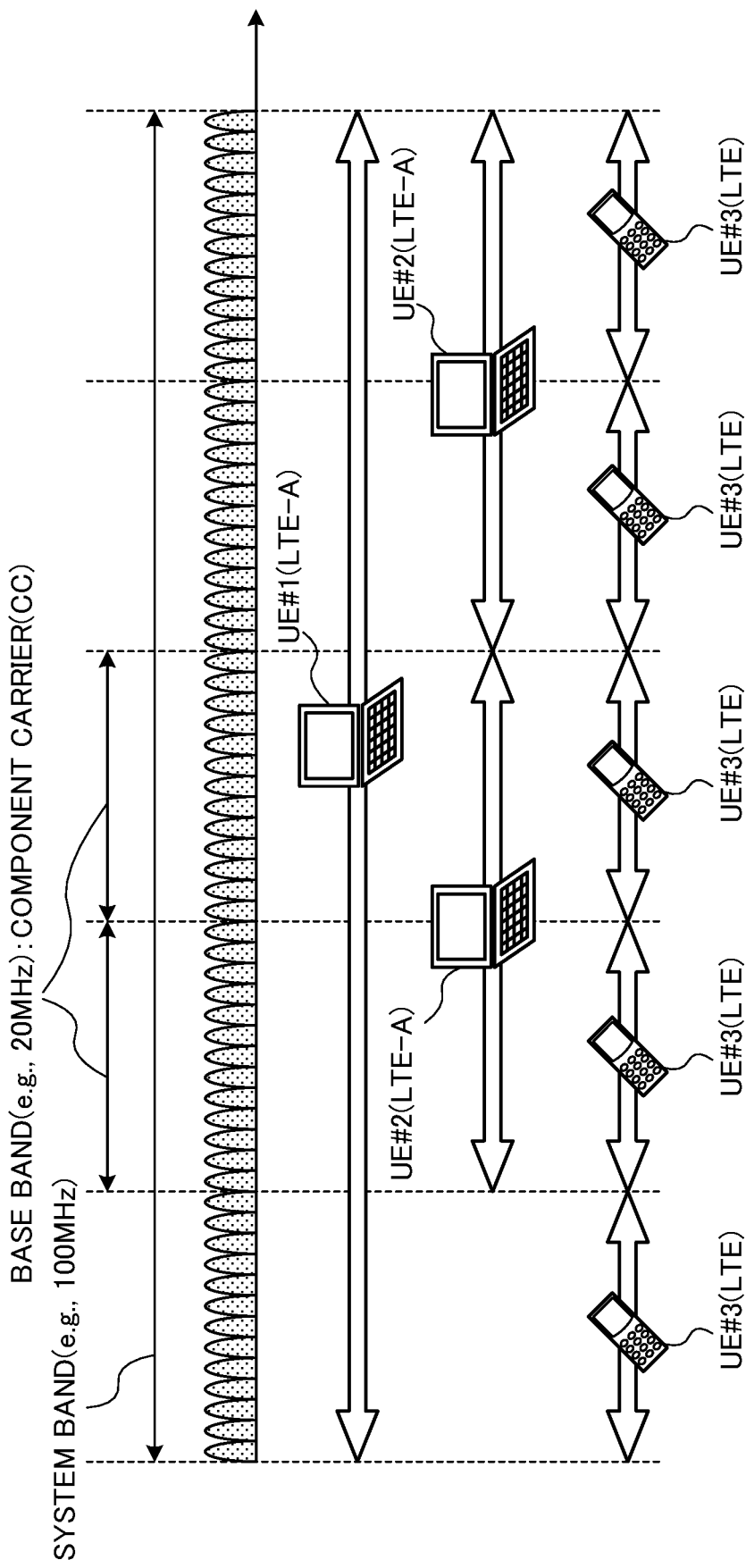
FIG. 1 is a diagram to explain a system band in an LTE-A system.

FIG. 1 is a diagram to show a layered bandwidth configuration defined in LTE-A. The example shown in FIG. 1 is a layered bandwidth configuration that is assumed when an LTE-A system having a first system band formed with a plurality of fundamental frequency blocks (hereinafter referred to as "component carriers"), and an LTE system having a second system band formed with one component carrier, coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, user terminal UE (User Equipment) #1 is a user terminal to support the LTE-A system (and also support the LTE system), and is able to support a system band up to 100 MHz. UE #2 is a user terminal to support the LTE-A system (and also support the LTE system), and is able to support a system band up to 40 MHz (20 MHz×2=40 MHz). UE #3 is a user terminal to support the LTE system (and not support the LTE-A system), and is able to support a system band up to 20 MHz (base band).

Figure 2:
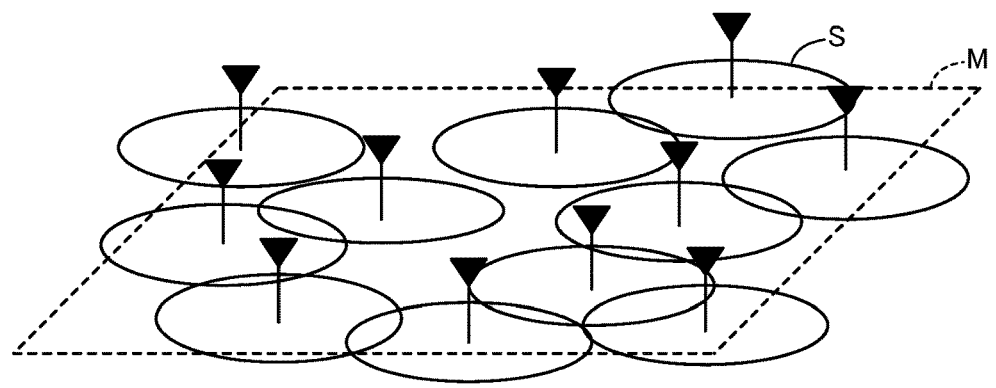
FIG. 2 is a diagram to show a configuration to arrange many small cells in a macro cell.

Now, future systems may anticipate a configuration in which a macro cell M and many small cell S's are arranged to geographically overlap, just as shown in FIG. 2. In this case, the small cell S's need to be designed taking into account capacity versus network costs. The network costs may include, for example, the cost of installing the network nodes, backhaul link and so on, the operation cost for cell planning and maintenance support, the power consumption on the network side, and so on. Also, as demands apart from capacity, small cell S's are required to support saved power consumption on the user terminal side, random cell planning, and so on.

Figure 3A:
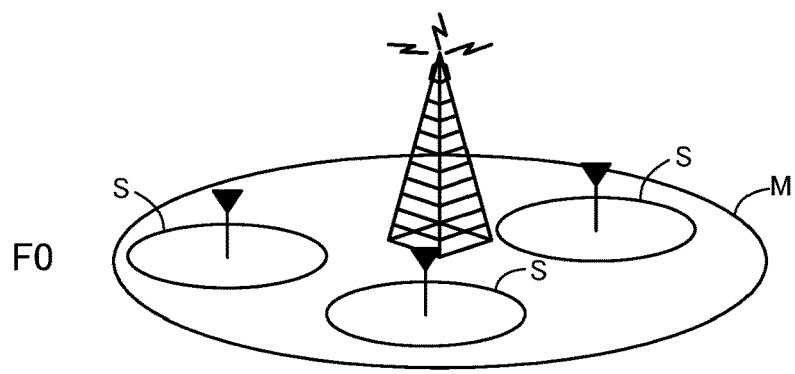
FIG. 3A provides a diagram to show one kind of heterogeneous network configurations.
Figure 3B:
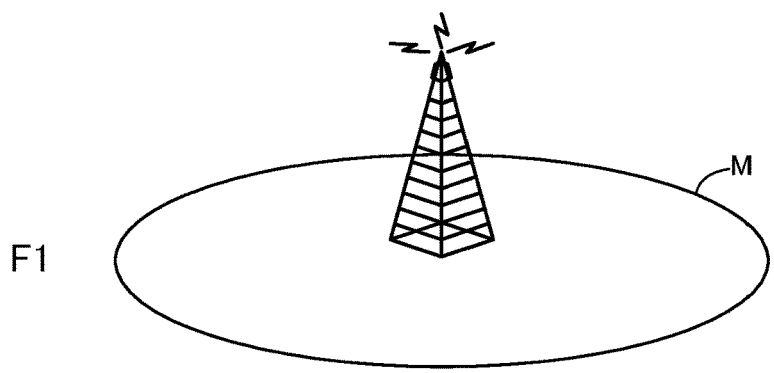
FIG. 3B provides a diagram to show another kind of heterogeneous network configurations.
Figure 3B:
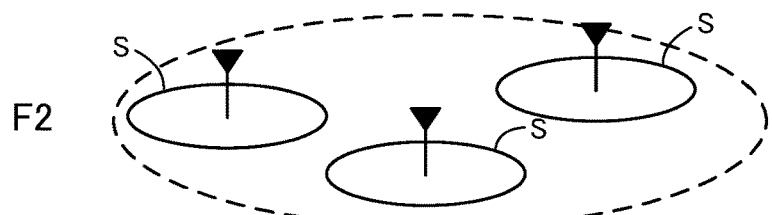

When a macro cell M and small cell S's are arranged to geographically overlap, two kinds of heterogeneous network (hereinafter referred to as "HetNet") configurations may be possible, as shown in FIGS. 3A and 3B. In the first HetNet configuration shown in FIG. 3A, the small cell S's are arranged such that the macro cell M and the small cell S's use the same carrier. In the second HetNet configuration shown in FIG. 3B, the small cell S's are arranged such that the macro cell M and the small cell S's use different carriers. In the second HetNet configuration, the small cell S's use a dedicated carrier, so that it is possible to secure coverage with the macro cell M and secure capacity with the small cell S's. It is expected that, in the future (Rel. 12 and later versions), this second HetNet configuration will become more important.

An example of a carrier used in the second HetNet configuration will be described with reference to FIG. 4. Note that, in the second HetNet configuration, the macro cell M is a cell having relatively wide coverage (for example, approximately a radius of 10 km), and may be referred to as a "wide area" and so on, and may be a sector. Also, the small cell S's are cells having local coverage (for example, approximately a radius of several meters), and may be referred to as "local areas," "pico cells," "nano cells," "femto cells," "micro cells," "eLA (enhanced Local Area) cells" and so on. Now, the radio base stations, apparatuses, nodes, transmission points and so on forming the macro cell M and the small cell S's (as coverage), will be hereinafter referred to as a "macro base station" and "small base stations," respectively.

Figure 4:
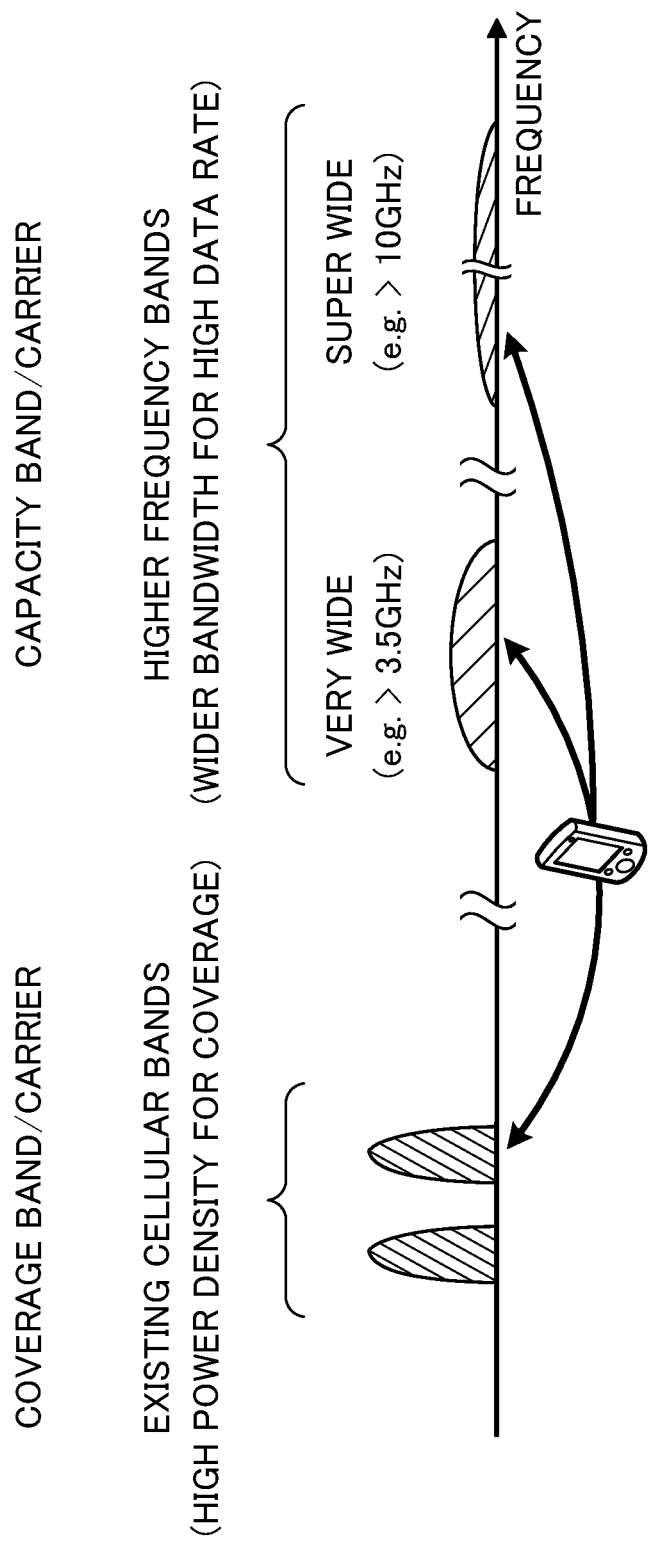
FIG. 4 is a diagram to show carriers used in a macro cell and a small cell.

As shown in FIG. 4, the macro cell M in the second HetNet configuration uses a carrier of a low frequency band such as the 2 GHz band. The macro cell carrier has relatively high power density and is transmitted with relatively high transmission power to have wide coverage. This macro cell carrier may be referred to as a "coverage carrier," "legacy carrier" and so on, and hereinafter referred to as a "coverage carrier." Also, the frequency band used in the macro cell M may be referred to as a "coverage band," a "conventional cellular band" and so on.

On the other hand, the carrier that is used in the small cell S's in the second HetNet configuration is a carrier of a high frequency band, such as the 3.5 GHz band, the 10 GHz band and so on. The small cell carrier has a relatively wide bandwidth to realize a high transmission rate. That is, the small cell carrier has a wider bandwidth than the macro cell carrier to improve the capacity of the small cell S's. Also, the bandwidth of the small cell carrier becomes wider in higher frequency bands. For example, as shown in FIG. 4, the bandwidth of carrier in the 10 GHz band becomes wider than the bandwidth of carrier in the 3.5 GHz band. Also, the small cell carrier may be referred to as a "capacity carrier," an "additional carrier," an "extension carrier" and so on, and hereinafter referred to as a "capacity carrier." Also, the frequency band used in the small cell S's may be referred to as a "capacity band" and so on.

In the second HetNet configuration like this, as shown in FIG. 5, it is expected that requirements and so on are different between the macro cell M and the small cell S's. For example, in the macro cell M, since the bandwidth is limited, spectral efficiency is very significant. By contrast with this, in the small cell S's, it is easy to take a wide bandwidth, so that, if a wide bandwidth can be secured, the significance of spectral efficiency is not as high as in the wide area. While the macro cell M needs to support high mobility such as represented by cars and/or the like, the small cell S's have only to support low mobility. Also, the macro cell M needs to secure wide coverage. On the other hand, although it is preferable to secure wide coverage with the small cell S's as well, the macro cell M can cover up shortage of coverage.

Also, in the macro cell M, significant capacity differences exist between the macro base station and a user terminal, so that the difference in the maximum transmission power between the uplink and the downlink grows, and the uplink and the downlink have asymmetrical transmission power. On the other hand, in the small cell S's, there are only insignificant capability differences between the small base stations and a user terminal, so that the difference of the maximum transmission power between the uplink and the downlink becomes smaller, and the uplink and the downlink have nearly symmetrical transmission power. Furthermore, in the macro cell M, the number of connecting users per cell is high and furthermore cell planning is applied, so that there is little variation of traffic. By contrast with this, in the small cell S's, the number of connecting users per cell is low, and furthermore there is a possibility that cell planning is not applied, so that there is significant variation of traffic. In this way, since characteristics of the small cell S's are different from those of the macro cell M, it is desirable to design radio communication schemes that are suitable for the small cell S's.

Figure 6:
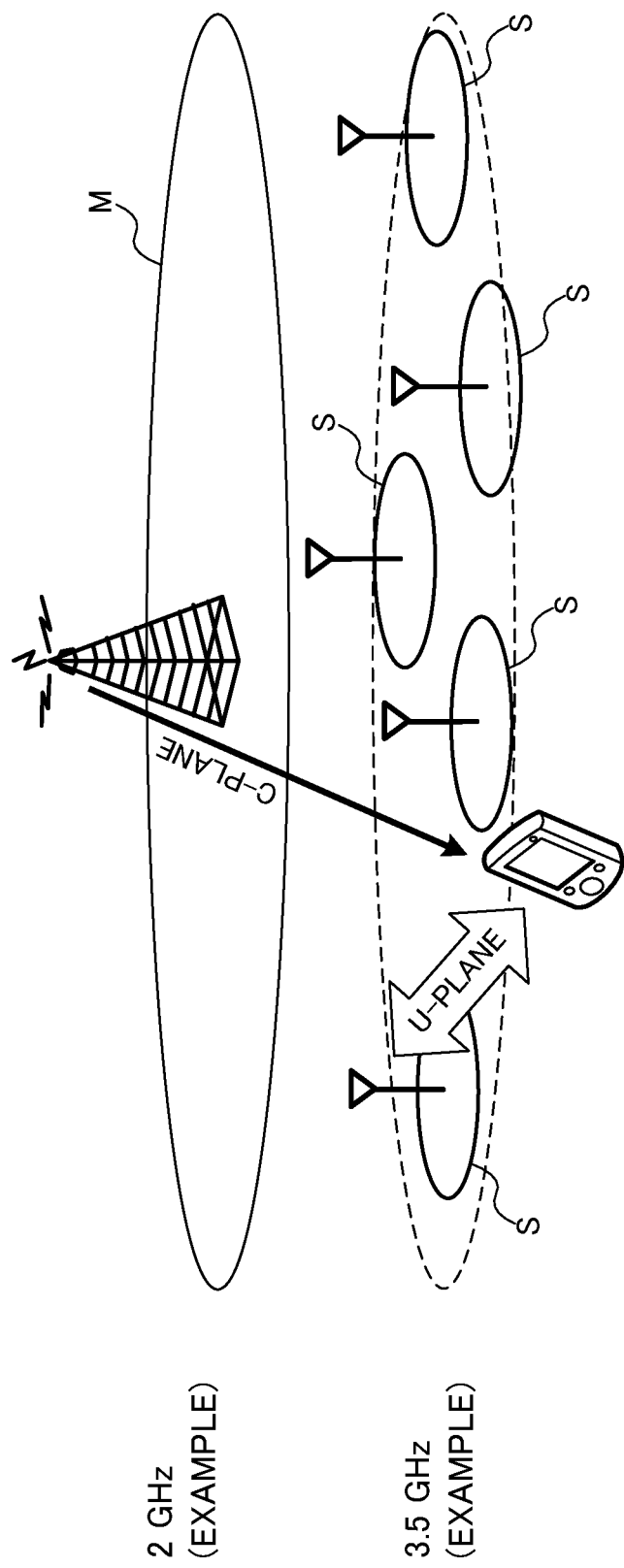
FIG. 6 is a diagram to show an example of a radio communication scheme in a second HetNet configuration.

FIG. 6 is a diagram to show an example of a radio communication scheme in a second HetNet configuration. In FIG. 6, the macro cell M in which a low frequency band such as the 2 GHz band is used, and the small cell S's in which a high frequency band such as 3.5 GHz band is used, are arranged to geographically overlap.

In the second HetNet configuration shown in FIG. 6, the user terminal carries out C-plane communication with the macro base station to form the macro cell M, and carries out U-plane communication with the small base stations to form the small cell S's. To be more specific, the user terminal establishes, reconstructs and releases connection between the user terminal and the small base stations by control of the macro base station. The user terminal transmits and receives mainly user data with the small base stations, so that it is possible to improve capacity in the small cell S's. In this way, the scheme in which the macro base station assists communication between the user terminal and the small base stations is also referred to as "Macro-assisted."

Figure 7:
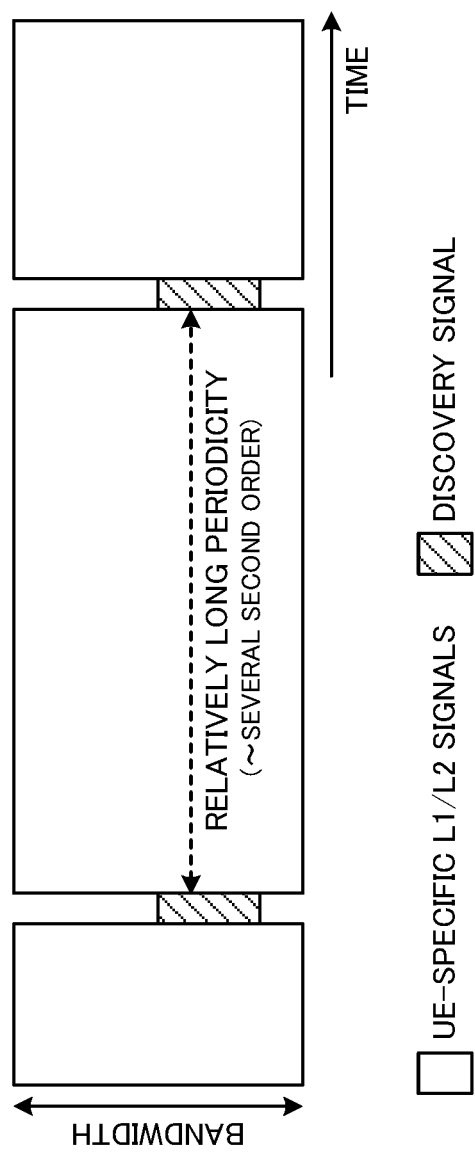
FIG. 7 is a diagram to show an example of signal design in a small cell.

Also, in the small cell S's in the second HetNet configuration, it is preferable to carry out signal transmission only when user data exists, for reduced interference against the macro cell M or for improved overall system throughput. For this reason, as shown in FIG. 7, it is preferable to design small cell S's based on UE-specific signals. For example, in FIG. 7, signals are designed based on the ePDCCH (enhanced Physical Downlink Control Channel), and the DM-RS (Demodulation-Reference Signal), without using the PSS/SSS (Primary Synchronization Signal/Secondary Synchronization Signal), the CRS (Cell-specific Reference Signal), the PDCCH (Physical Downlink Control Channel) and so on in LTE.

Here, the ePDCCH (enhanced downlink control signal) refers to a downlink control signal that is frequency-division-multiplexed on the PDSCH (Physical Downlink Shared Channel) (downlink data signal). Similar to the PDSCH, the ePDCCH is demodulated by using the DM-RS, which is a user-specific demodulation reference signal. The small cell S's may be configured to receive the PDSCH (downlink data signal) based on the ePDCCH (enhanced downlink control signal), without providing the PDCCH (downlink control signal) that is arranged in maximum three OFDM symbols from the top of a subframe. Note that the ePDCCH may be referred to as the "FDM-type PDCCH" or may be referred to as the "UePDCCH." In FIG. 7, the PDSCH, the ePDCCH, the DM-RS and so on are shown as UE-specific L1/L2 signals.

In addition, in small cell S's, as shown in FIG. 7, defining discovery signals in the downlink is being under study. Here, the discovery signals refer to detection signals that are used to allow a user terminal to detect the small base stations, and one of the common control signals that are common in the small cell S. As shown in FIG. 7, discovery signals are transmitted in a relatively long cycle (for example, on the order of several seconds), so that a user terminal is able to reduce the number of times of measurement and save battery. This discovery signal may be referred to as the PDCH (Physical Discovery Channel), the BS (Beacon Signal), the DPS (Discovery Pilot Signal) and so on.

Figure 8A:
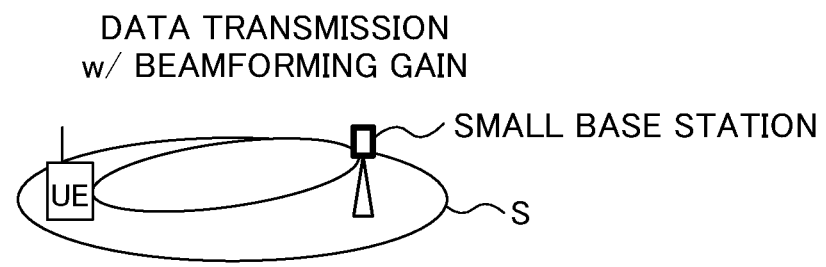
FIG. 8A provides a diagram to show a first example of transmission beam formation in a small cell.

Now, in the small cell S's in the second HetNet configuration described above, coverage tends to become smaller since the capacity carrier of the high frequency band such as the 3.5 GHz band or the 10 GHz band is used. So, as shown in FIG. 8A, expanding coverage of the small cell S's by forming a transmission beam directed from the small base stations to the user terminal (UE) may be possible. A transmission beam directed to the user terminal can be formed based on feedback information from the user terminal (for example, PMI (Precoding Matrix Indicator) and so on). The user terminal can acquire beam forming gain with respect to the downlink data signal (PDSCH) and the enhanced downlink control signal (ePDCCH) transmitted by using this transmission beam.

Figure 8B:
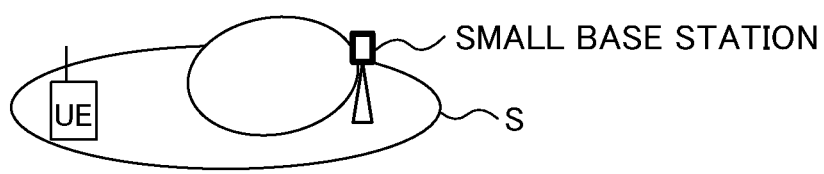
FIG. 8B provides a diagram to show a second example of transmission beam formation in a small cell.

On the other hand, as shown in FIG. 8B, before the user terminal is connected, the small base stations cannot acquire feedback information from the user terminal, and therefore cannot form a transmission beam based on the feedback information. Consequently, beam forming gain cannot be achieved with respect to common control/reference signals that are common in the small cell S transmitted from the small base station before the user terminal is connected, and therefore, it is not possible to secure coverage.

Figure 8C:
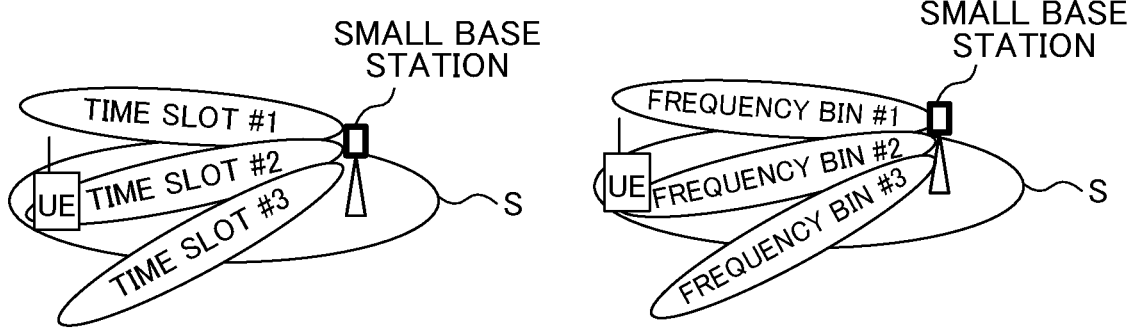
FIG. 8C provides a diagram to show a third example of transmission beam formation in a small cell.

As the method to secure the coverage of these common control/reference signals, as shown in FIG. 8C, it may be possible to form transmission beams directed to all directions in the small cell S's by time division or by frequency division. For example, as shown in FIG. 8C, it may be possible to form transmission beams directed to different directions in each time slot #1 to #3, or form transmission beams directed to different directions in each frequency bin #1 to #3.

As shown in FIG. 8C, when transmission beams directed to different directions are formed by time division or by frequency division, it is possible to secure coverage for the common control/reference signals mentioned above even without feedback information from the user terminal.

On the other hand, in the case illustrated in FIG. 8C, since transmission beams may be formed in directions where there are no user terminals (for example, directions completely opposite to the positions of the user terminals), there is a problem that the time that the user terminal takes to detect the common control/reference signals transmitted by using these transmission beams becomes long. Also, it is expected that this problem can happen not only with the common control/reference signals transmitted before the user terminal is connected but also with the common control/reference signals transmitted after the user terminal is connected.

So, the present inventors have arrived at the present invention to shorten the time the user terminal takes to detect the common control/reference signals that are common in the small cell S that is arranged to geographically overlap with the macro cell and use a carrier of a high frequency band while coverage of the common control/reference signals transmitted from the small base station is secured. That is, a gist of the present invention is that the macro base station estimates the rough position of the user terminal estimated by communication using a coverage carrier with the user terminal, and the small base stations transmit the common control/reference signals that are common in the small cell S by using the transmission beams directed to the rough position of the user terminal. By this means, it is possible to shorten the time the user terminal takes to detect the common control/reference signals while coverage of the common control/reference signals that are common in small cell S is secured.

Hereinbelow, formation of transmission beam in the small cells according to the present embodiment will be described. Note that, the following description will assume a radio communication system arranging a plurality of small cell C2s in a macro cell C1 (refer to FIG. 13). Assume that, this radio communication system adopts the second HetNet configuration described above, and that a coverage carrier of a low frequency band such as the 2 GHz band is used in the macro cell C1, and a capacity carrier of a high frequency band such as the 3.5 GHz band or the 10 GHz band is used in the small cell C2s. However, this radio communication system is only an example, and a carrier of a high frequency band may be used in the macro cell C1.

Figure 9:
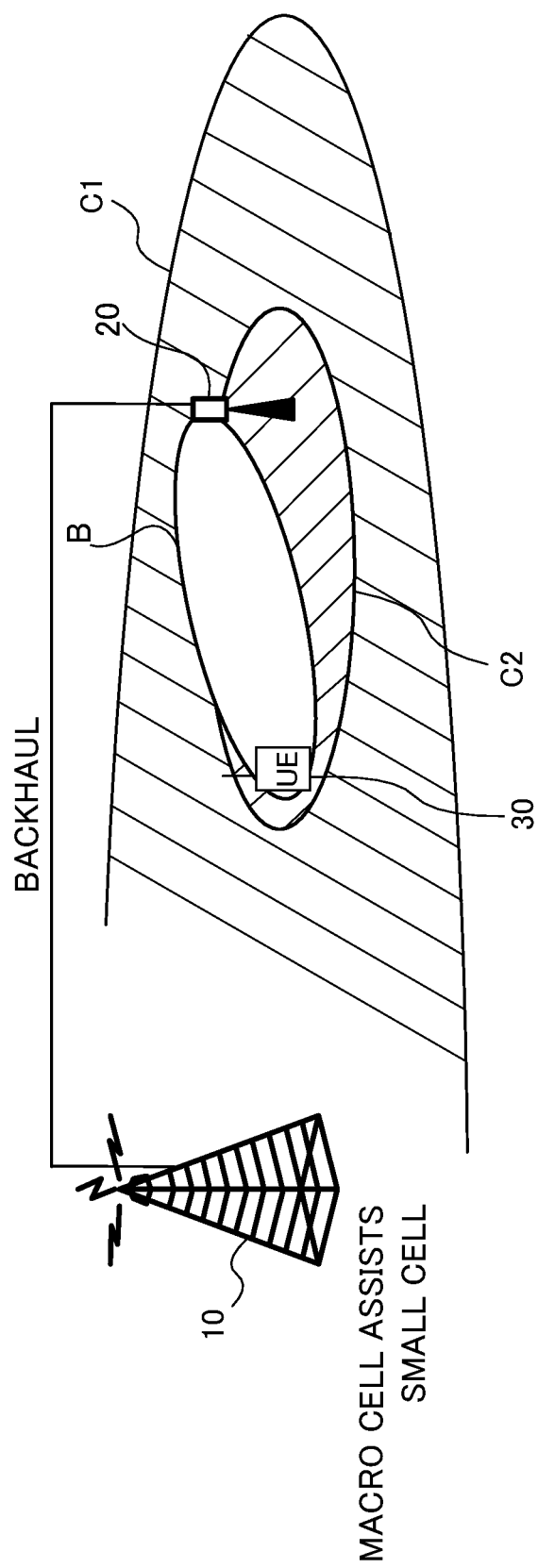
FIG. 9 is a conceptual diagram to show transmission beam formation in a small cell according to the present embodiment.

FIG. 9 is a conceptual diagram to show transmission beam formation in the small cells according to the present embodiment. As shown in FIG. 9, a macro base station 10 estimates position-related information of a user terminal 30 by communication with the user terminal 30 using a coverage carrier (first carrier). The macro base station 10 reports the estimated position-related information of the user terminal 30 to a small base station 20 via backhaul link (a wire interface such as an X2 interface, or a radio interface). Based on the position-related information of the user terminal 30 reported from the macro base station 10, the small base station 20 forms a transmission beam B of a capacity carrier (second carrier) directed to the user terminal 30, and transmits at least one common control signal or a reference signal that are common in the small cell C2 by using the transmission beam B.

Here, the position-related information of the user terminal 30 may be position information of the user terminal 30 (for example, the latitude and the longitude and so on), or may be information that can estimate the position of the user terminal 30, such as distance information from the macro base station 10 to the user terminal 30, path loss to the user terminal 30 in the coverage carrier, or transmission/reception beam directions of the coverage carrier (direction of departure (DOD), direction of arrival (DOA) and so on) and precoding weight for forming the transmission beam, transmission power and so on. Similarly, position-related information of the small base station 20, which will be described later, may be position information of the small base station 20, or information that can estimate the position of the small base station 20.

Also, the common control signals refer to control signals that are common in C2 (Cell-specific), and include, for example, the discovery signal described in FIG. 7, the CCH (Common Control Channel) signal, or the broadcast signal BCH (Broadcast Channel), and the synchronization signal and so on. Also, the reference signals include the CRS (Cell-specific Reference Signal), the channel estimation reference signal CSI-RS (Channel State Information Reference Signal) and so on. Hereinafter, at least one of a common control signal and a reference signal transmitted by using the transmission beam B in FIG. 9 will be abbreviated as a "common control/reference signal" for ease of explanation.

Note that, although not shown, the transmission beam B formed in FIG. 9 may transmit the control signals or the reference signals by a plurality of transmission beams (multi beams). In this case, each transmission beam may have a different beam pattern (directivity, precoding weight) directed to the rough position of the user terminal 30, as shown in FIG. 8C.

Also, the transmission beam B formed in FIG. 9 may be a plurality of transmission beams with different time resource units such as transmission time slots or subframes, or may be a plurality of transmission beams with frequency resource units such as frequency blocks that vary in the frequency directions. In this case, each transmission beam may have a different beam pattern (directivity, precoding weight) directed to the rough position of the user terminal 30, as shown in FIG. 8C.

As described above, in FIG. 9, a transmission beam B of a capacity carrier is formed based on the position-related information of the user terminal 30 (that is, the (rough) position of the user terminal 30) estimated by communication using a coverage carrier of the macro base station 10 and the user terminal 30. Consequently, transmission beams are not formed in directions where there are no user terminals 30. As a result, it is possible to shorten the time the user terminal takes to detect the common control/reference signals while coverage of the control/reference signals that are common in the small cell C2 is secured.

Figure 10:
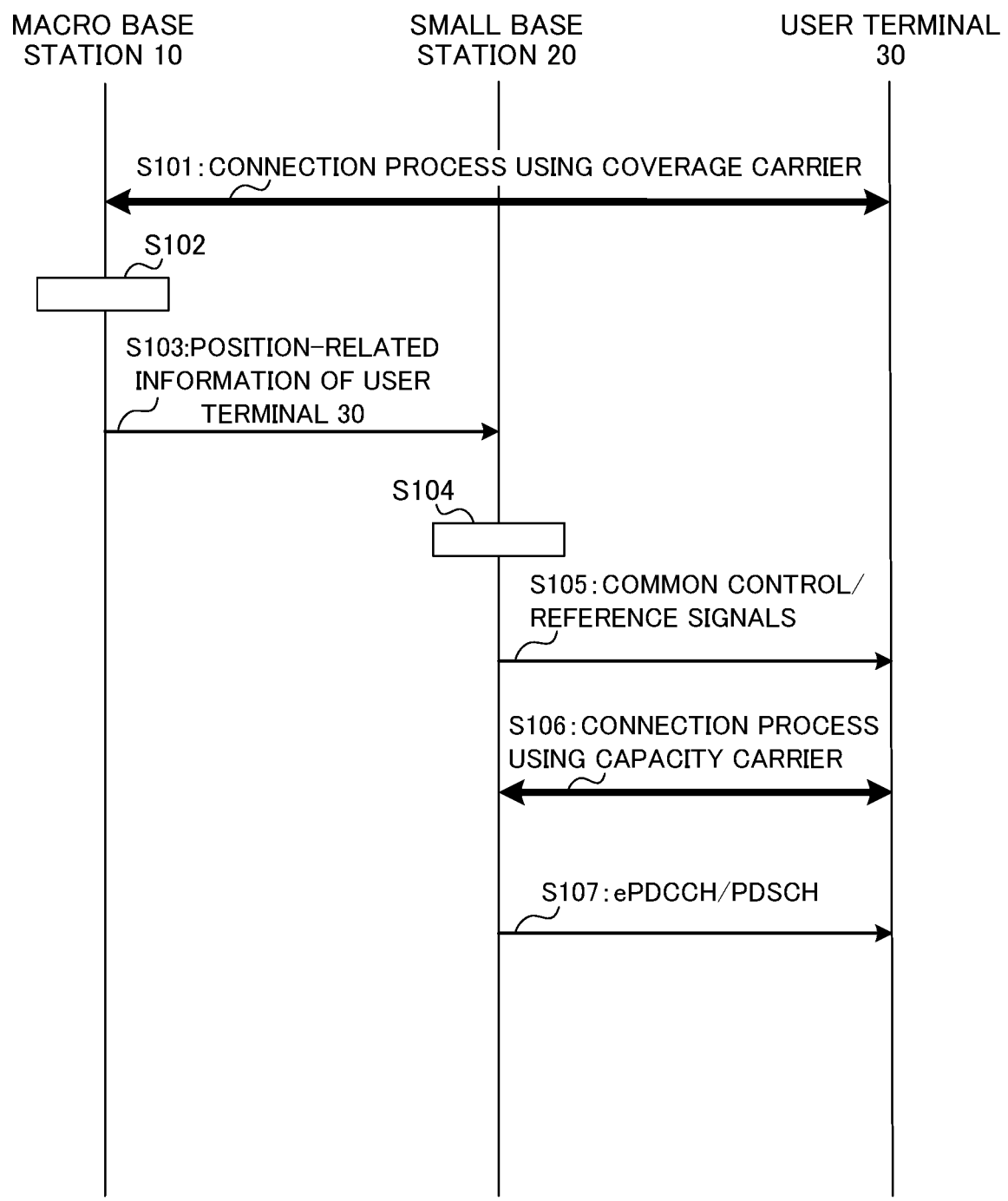
FIG. 10 is a sequence diagram to show a radio communication method according to a first example of the present embodiment.

Next, a radio communication method according to the present embodiment will be described in detail with reference to FIGS. 10 and 11. FIG. 10 is a sequence diagram to show a radio communication method according to the first example of the present embodiment. In FIG. 10, a macro base station 10 and a small base station 20 are connected with backhaul link (a wire interface such as an X2 interface or a radio interface). Also, assume that a user terminal 30 is connected with the macro base station 10 and the small base station 20 by a radio interface.

As shown in FIG. 10, the user terminal 30 carries out a connection process for the macro base station 10 by using a coverage carrier (step S101). Based on communication with the user terminal 30 using the coverage carrier, the macro base station 10 estimates position-related information of the user terminal 30 (step S102). Based on the signal receiving quality of the coverage carrier (for example, SINR (Signal to Noise Interference Ratio) and so on), for example, the macro base station 10 estimates the position-related information of the user terminal 30. Note that the macro base station 10 may acquire the position-related information of the user terminal 30 from the user terminal 30.

The macro base station 10 reports the position-related information of the user terminal 30 via backhaul link (step S103). Based on the position-related information of the user terminal 30 received from the macro base station 10 and the position-related information of the small base station 20, the small base station 20 generates beam forming information (step S104).

Here, the beam forming information refers to information for forming the transmission beam of the capacity carrier directed from the small base station 20 to the user terminal 30, and includes, for example, the directions (direction of departure (DOD), direction of arrival (DOA) and so on), precoding weight, transmission power, path loss to the user terminal 30 of the transmission beam and so on.

For example, by using the position-related information of the user terminal 30 as I1 and the position-related information of the small base station 20 as I2, as shown in the following equation 1, the small base station 20 may generate precoding weight $W_{beam}$ and transmission power P as the beam forming information using a predetermined function.

$$(P, W_{beam}) = \text{function} (I1, I2) \qquad \text{(Equation 1)}$$

The small base station 20 transmits common control/reference signals (for example, discovery signals) by using transmission beams formed based on the beam forming information in step S104 (step S105). To be more specific, the small base station 20 may precode common control/reference signals by using the precoding weight generated as the beam forming information, and transmit the precoded common control/reference signals from a plurality of transmitting antennas by using the capacity carrier. Also, the small base station 20 may transmit the common control/reference signals by the transmission power generated as the beam forming information.

When the common control/reference signals transmitted by using the transmission beam mentioned above are detected, based on the result of the common control/reference signal detection, the user terminal 30 carries out a connection process for the small base station 20 by using the capacity carrier (step S106). To be more specific, the user terminal 30 transmits uplink control signals (for example, the DACH (Direct Access Channel) and so on) to the small base station 20. These uplink control signals may include feedback information such as received quality and pathloss of the common control/reference signals from the base station 20, and/or channel state information (CSI) measured based on the measurement reference signal (CSI-RS).

When the connection process for the small base station 20 by the user terminal 30 is complete, the small base station 20 transmits the enhanced downlink control signal (ePDCCH) and the downlink data signal (PDSCH) (step S107). These ePDCCH and PDSCH are transmitted by a transmission beam specific to the user terminal 30 (UE-specific) formed on the basis of the feedback information (for example, PMI and so on) from the user terminal 30.

As described above, with the radio communication method according to the first example shown in FIG. 10, a transmission beam of a capacity carrier is formed based on the position-related information of the user terminal 30 (that is, the (rough) position of the user terminal 30) estimated by communication using a coverage carrier of the macro base station 10 and the user terminal 30 and the position-related information of the small base station 20. Consequently, the small base station 20 does not form transmission beams in directions where there are no user terminals 30, even if the feedback information from the user terminal 30 cannot be acquired. As a result, it is possible to shorten the time the user terminal 30 takes to detect the common control/reference signals while coverage of the common control/reference signals that are common in the small cell C2 is secured.

Figure 11:
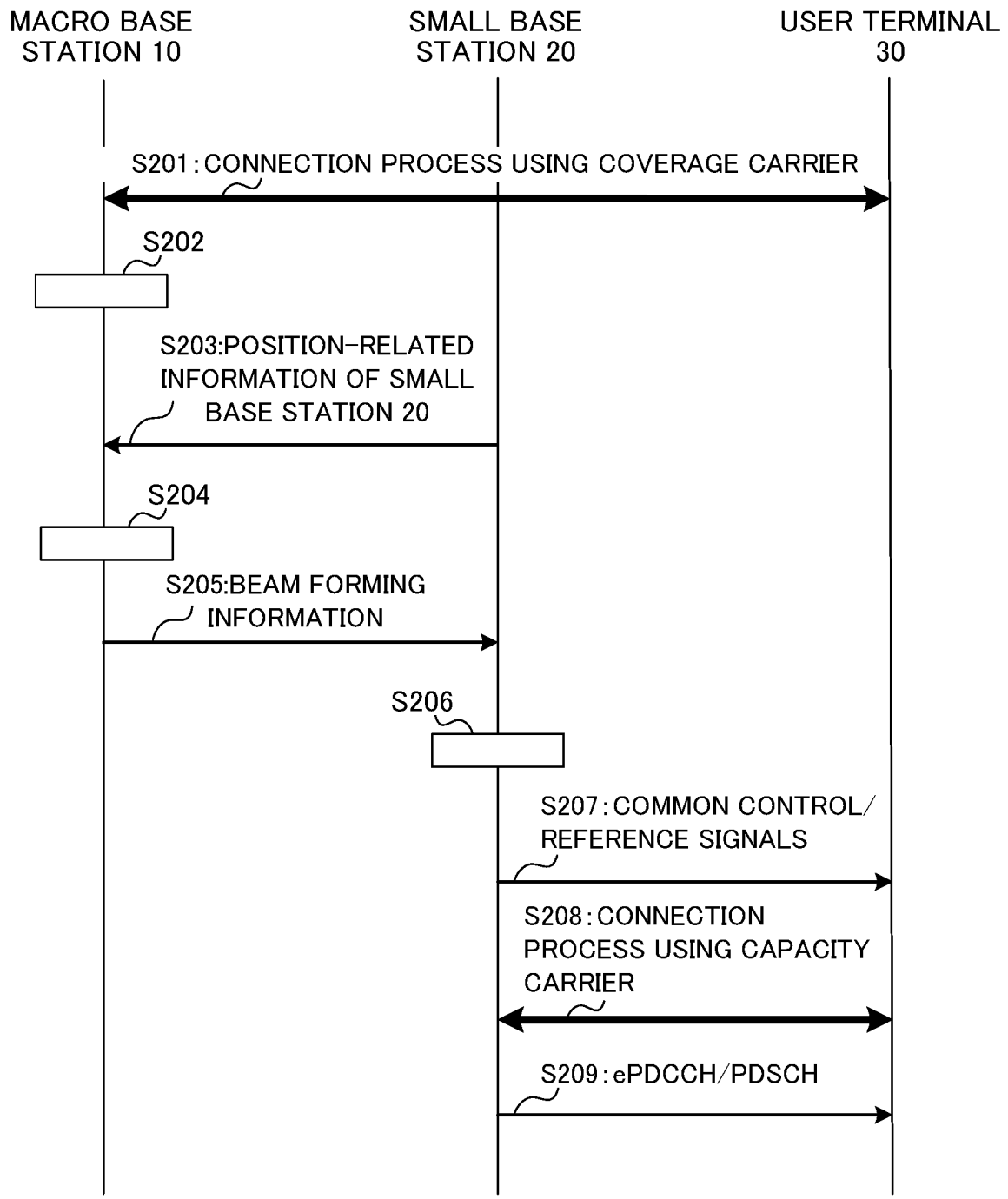
FIG. 11 is a sequence diagram to show a radio communication method according to a second example of the present embodiment.

FIG. 11 is a sequence diagram to show a radio communication method according to the second example of the present embodiment. The radio communication method shown in FIG. 11 is different from the radio communication method shown in FIG. 10 in that beam forming information is generated in the macro base station 10, not in the small base station 20. Different points with FIG. 10 will be mainly described hereinafter.

Steps S201 and S202 in FIG. 11 are the same as steps S101 and S102 in FIG. 10. As shown in FIG. 11, the macro base station 10 acquires position-related information of the small base station 20 (step S203). Note that if the macro base station 10 memorizes the position-related information of the small base station 20 beforehand, step S203 may be eliminated.

The macro base station 10 generates the beam forming information described above, based on the position-related information of the user terminal 30 estimated in step S202 and the position-related information of the small base station 20 (step S204). The macro base station 10 reports the generated beam forming information to the small base station 20 (step S205).

The small base station 20 forms transmission beams based on the beam forming information reported from the macro base station 10 (step S206). To be more specific, the small base station 20 precodes the common control/reference signals by using the beam forming information (for example, a precoding weight, or a precoding weight calculated based on a direction of a transmission beam and so on).

The small base station 20 transmits common control/reference signals by using the formed transmission beam (step S207). To be more specific, the small base station 20 transmits the precoded common control/ reference signals from a plurality of transmitting antennas by using a capacity carrier. Also, the small base station 20 may transmit the common control/reference signals by using the beam forming information (for example, transmission power) reported from the macro base station 10. Note that steps S207 to S209 in FIG. 11 are the same as steps S105 to 107 in FIG. 10.

As described above, with the radio communication method according to the second example shown in FIG. 11, the macro base station 10 generates beam forming information and reports the information to the small base station 20 based on the position-related information of the user terminal 30 (that is, the (rough) position of the user terminal 30) estimated by communication using a coverage carrier of the macro base station 10 and the user terminal 30. As a result, the small base station 20 does not need to generate beam forming information for forming the transmission beam directed to the user terminal 30, so that it is possible to reduce the processing load of the small base station 20 compared to the radio communication method according to the first example.

Next, a configuration of transmitting antenna suitable for a small base station according to the present embodiment will be described with reference to FIGS. 12. As described with reference to FIG. 4, small cell C2s use a high frequency band such as the 3.5 GHz band or the 10 GHz band. In the high frequency band, path loss becomes significant in $20*\log(f)$ to $23*\log(f)$. For example, changing a 1 GHz band carrier to a 10 GHz band carrier is equal to losing 20 dB of power. Consequently, it may be possible to compensate path loss with a high frequency band and prevent reduction of coverage by applying "Massive MIMO" in the small base station.

Figure 12A:
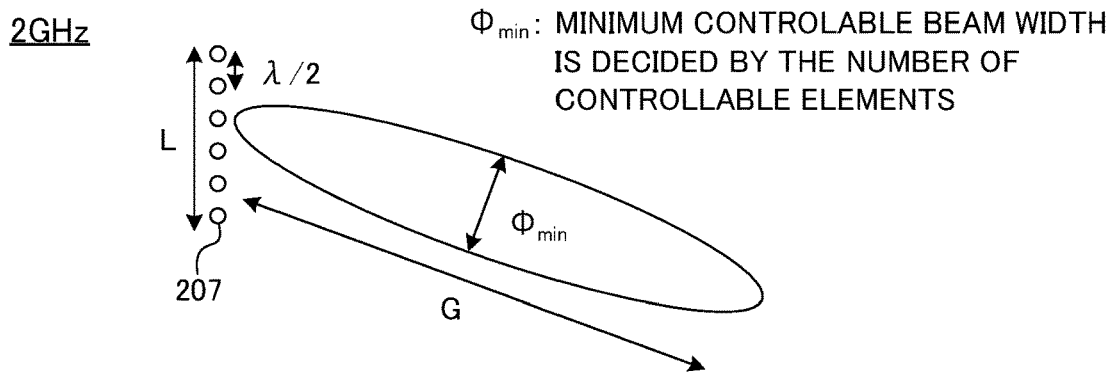
FIG. 12A provides a diagram to explain a first application example of "Massive MIMO" in a small base station.

FIGS. 12 provide diagrams to explain application examples of "Massive MIMO" in the small base station according to the present embodiment. FIG. 12A shows a case where six transmitting antennas 207 (elements) are arranged at the antenna length L and at an element interval of $\lambda/2$ in the small base station 20. In this case, as shown in FIG. 12A, in a low frequency band such as the 2 GHz band, a transmission beam with beam forming gain G is formed with beam width $\varphi_{min}$.

Figure 12B:
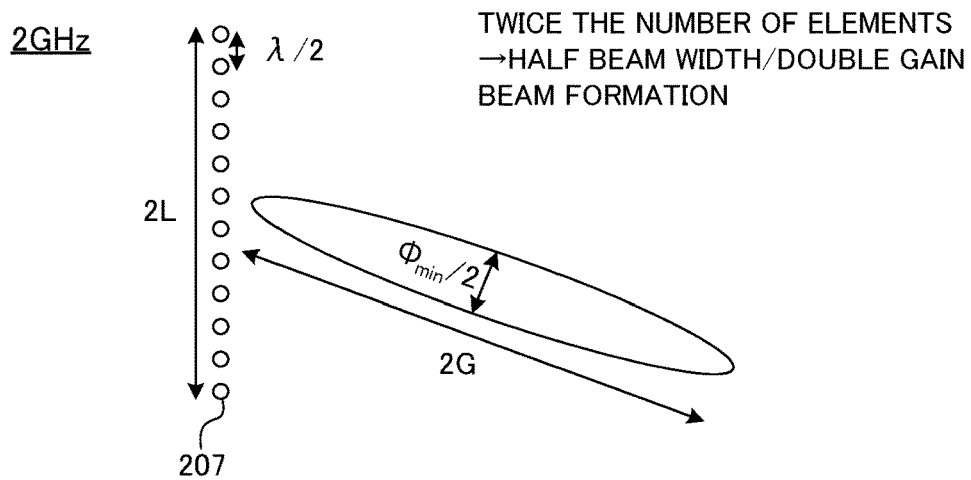
FIG. 12B provides a diagram to explain a second application example of "Massive MIMO" in a small base station.

FIG. 12B shows a case where twelve transmitting antennas 207 (elements), which is double as in FIG. 12A, are arranged at the antenna length 2L, which is double as in FIG. 12A, and at an element interval of $\lambda/2$, which is the same as in FIG. 12A. In this case, in the low frequency band same as in FIG. 12A, such as the 2 GHz band, it is possible to make the beam width $\varphi_{min}/2$, which is half as in FIG. 12A, and a transmission beam with beam forming gain 2G, which is double as in FIG. 12A, can be formed. On the other hand, in FIG. 12B, the antenna length 2L of the transmitting antennas 207 (elements) becomes double as in FIG. 12A, so that, there is a big problem with space.

Figure 12C:
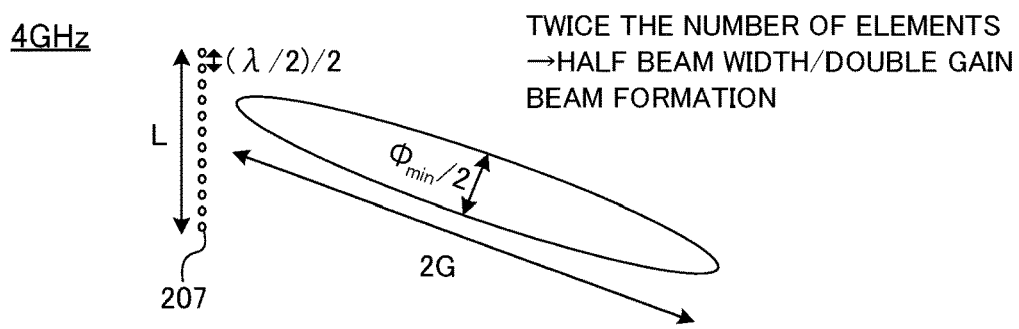
FIG. 12C provides a diagram to explain a third application example of "Massive MIMO" in a small base station.

FIG. 12C shows a case where twelve transmitting antennas 207 (elements), which is double as in FIG. 12A, are arranged at the antenna length L, which is same as in FIG. 12A, and at an element interval of $(\lambda/2)/2$, which is half as in FIG. 12A. In this case, by using a frequency band, which is double as in FIG. 12A (that is, a high frequency band such as the 4 GHz band), it is possible to make the beam width $\varphi_{min}/2$, which is half as in FIG. 12A, and a transmission beam with beam forming gain 2G, which is double as in FIG. 12A, can be formed. That is, in FIG. 12C, the same effect as in FIG. 12B can be achieved with the same space as in FIG. 12A.

Consequently, a high frequency band such as the 3.5 GHz band or the 10 GHz band used in the small base station 20, as shown in FIG. 12C, the element interval of the transmitting antennas 207 (elements) may be set short so that the antenna length L becomes the same even when the number of antennas (the number of elements) is increased. By this means, in the small base station 20, without expanding the space to arrange transmitting antennas 207, it is possible to form a transmission beam with a narrow beamwidth and effectively expand the coverage.

As described above, by applying "Massive MIMO" to the small base station 20, it is possible to effectively expand coverage of a transmission beam of a capacity carrier in a high frequency band.

Now, a radio communication system according to the present embodiment will be described in detail.

Figure 13:
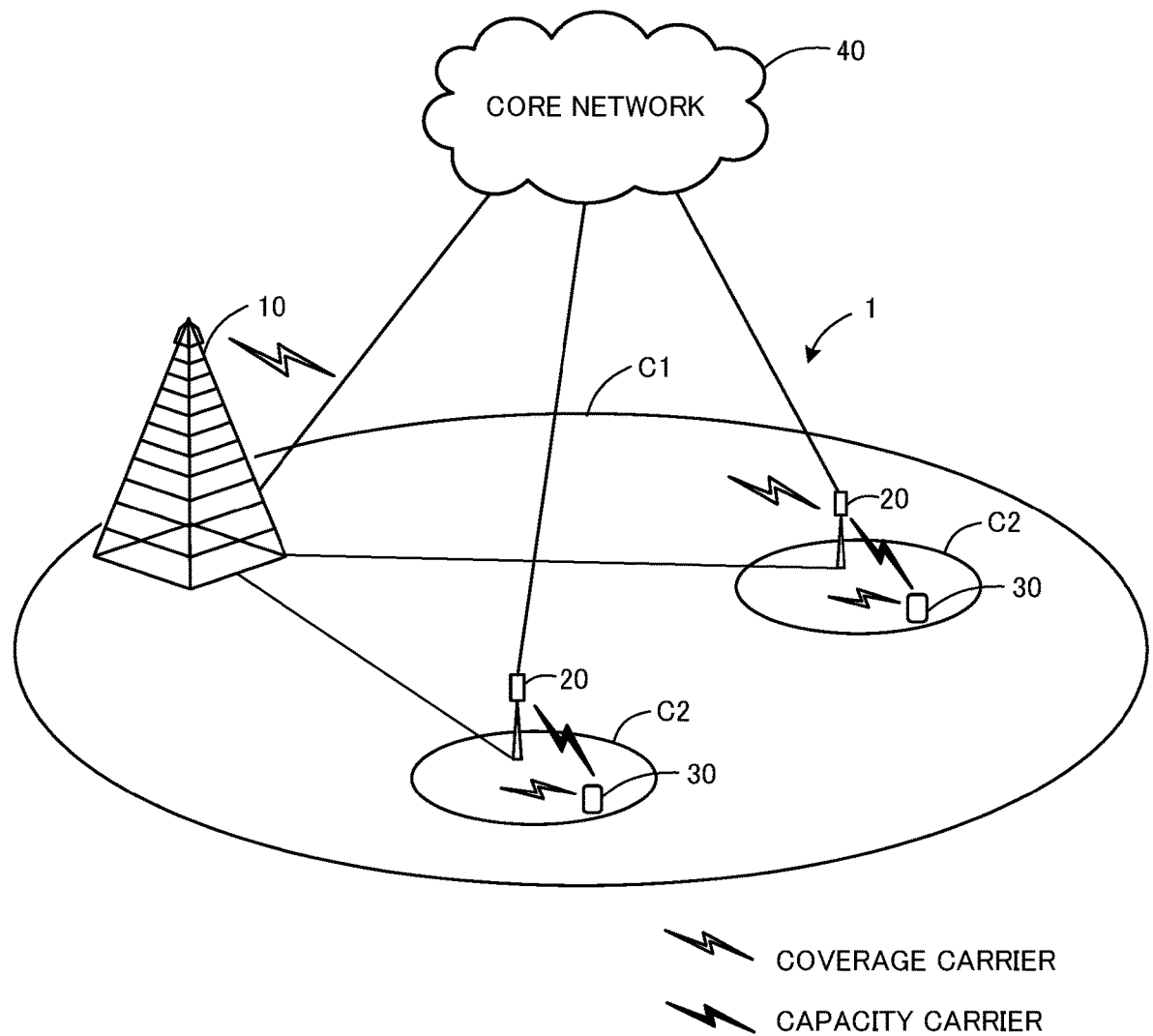
FIG. 13 is a schematic diagram to show an example of a radio communication system according to the present embodiment.

FIG. 13 is a diagram to explain a system configuration of a radio communication system according to the present embodiment. Note that the radio communication system shown in FIG. 13 is a system to accommodate, for example, the LTE system or SUPER 3G. In this radio communication system, carrier aggregation to group a plurality of fundamental frequency blocks (component carriers) as one, where the system band of the LTE system is one unit, is used. Also, this radio communication system may be referred to as "IMT-Advanced," or may be referred to as "4G," "FRA" (Future Radio Access) and so on.

As shown in FIG. 13, a radio communication system 1 has a macro base station 10 forming a macro cell C1, and a plurality of small base stations 20 forming small cell C2s narrower than the macro cell C1 and located in the macro cell C1. Also, in the macro cell C1 and each small cell C2, many user terminals 30 are arranged. The user terminals 30 support the radio communication schemes for the macro cell and for the small cells, and are configured to be able to carry out radio communication with the macro base station 10 and the small base stations 20.

Communication between the user terminals 30 and the macro base station 10 is carried out using a coverage carrier (for example, a carrier of a low frequency band). Communication between the user terminals 30 and the small base stations 20 is carried out using a capacity carrier (for example, a carrier of a high frequency band). Also, the macro base station 10 and each small base station 20 are connected with each other by wire connection or by radio connection.

The macro base station 10 and each small base station 20 are each connected with a higher station apparatus, which is not illustrated, and are connected to a core network 40 via the higher station apparatus. Note that the higher station apparatus may be, for example, an access gateway apparatus, a radio network controller (RNC), a mobility management entity (MME) and so on, but is by no means limited to these. Also, the small base stations 20 may be connected with the higher station apparatus via the macro base station 10.

Note that the macro base station 10 is a radio base station having relatively wide coverage, and may be referred to as "eNodeB," a "radio base station apparatus," or a "transmission point." Also, the small base stations 20 are radio base stations having local coverage, and may be referred to as "pico base stations," "femto base stations," "Home eNodeBs," "RRHs" (Remote Radio Heads), "micro base stations," or "transmission points." Each user terminal 30 is a terminal supporting each kind of communication scheme such as LTE or LTE-A, and may include not only a mobile communication terminal but also a fixed communication terminal.

In the radio communication system, as radio access schemes, OFDMA (Orthogonal Frequency Division Multiple Access) is applied to the downlink, and SC-FDMA (Single Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels used in the radio communication system shown in FIG. 13 will be described. Downlink communication channels include a PDSCH (Physical Downlink Shared Channel), which is used by each user terminal 30 on a shared basis, and downlink L1/L2 control channels (PDCCH, PCFICH, PHICH). User data and higher control information are transmitted by the PDSCH. Scheduling information and so on for the PDSCH and the PUSCH are transmitted by the PDCCH (Physical Downlink Control Channel). The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel). Also, by ePDCCH (enhanced Physical Downlink Control Channel), scheduling information of the PDSCH and the PUSCH and so on may be transmitted.

Uplink communication channels include a PUSCH (Physical Uplink Shared Channel), which is used by each user terminal 30 on a shared basis as an uplink data channel, and a PUCCH (Physical Uplink Control Channel), which is an uplink control channel. User data and higher control information are transmitted by this PUSCH. Also, downlink radio quality information (CQI: Channel Quality Indicator), ACK/NACK and so on are transmitted by the PUCCH. Also, as an access channel to the macro base station 10, a PRACH (Physical Random Access Channel) may be used, and, as an access channel to the small base stations 20, DACH (Direct Access Channel) and so on may be used.

Next, a detailed configuration of a radio communication system according to the present embodiment will be described with reference to FIGS. 14 to 16.

Figure 14:
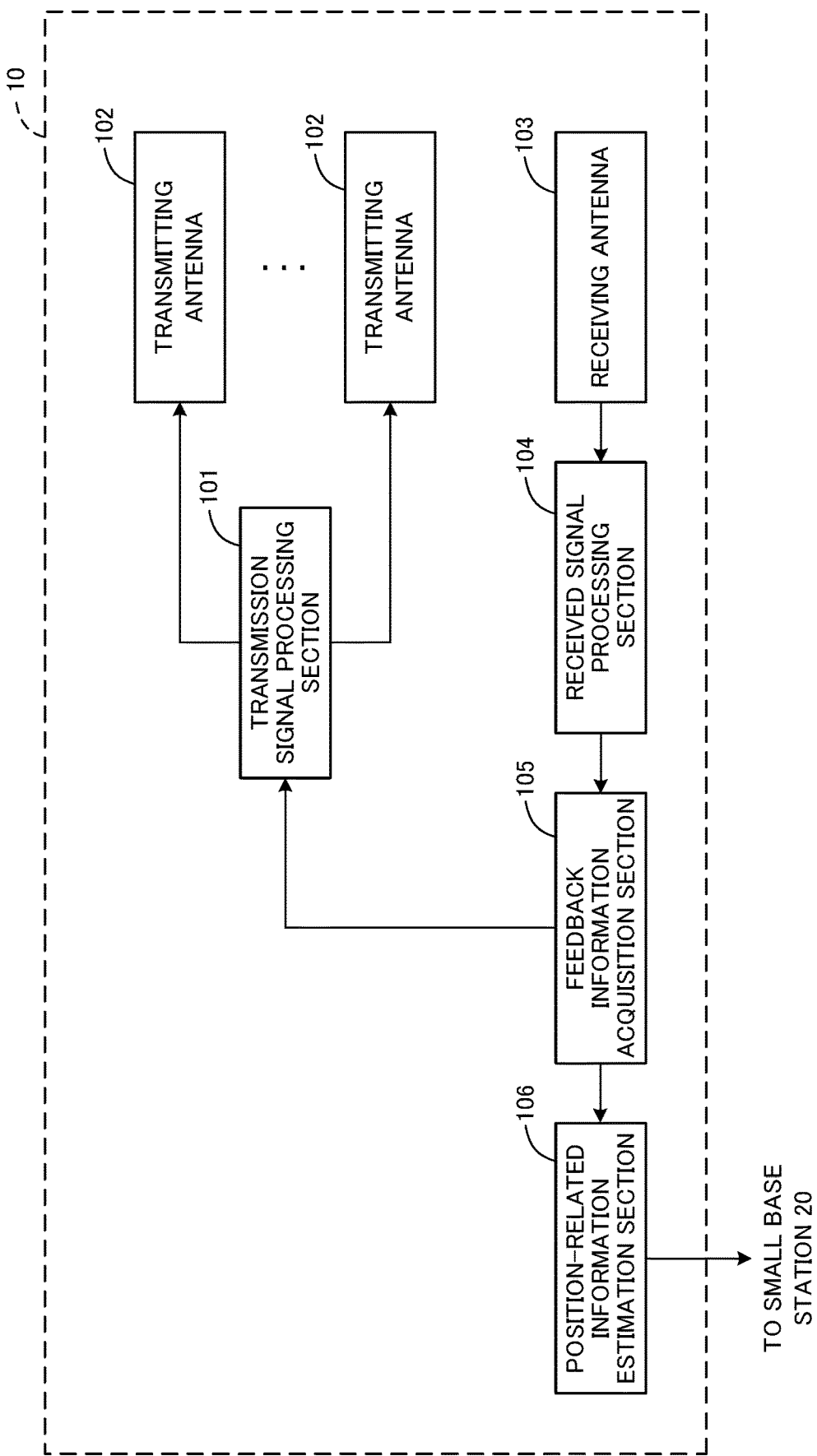
FIG. 14 is a configuration diagram to show an example of a macro base station according to the present embodiment.

FIG. 14 is a schematic block diagram to show a detailed configuration of a macro base station 10 according to the present embodiment. The macro base station 10 has a transmission signal processing section 101 and a plurality of transmitting antennas 102 as processing sections of a transmitting sequence.

The transmission signal processing section 101 generates downlink signals to transmit using a coverage carrier, and based on feedback information input from a feedback information acquisition section 105, which will be described later, carries out transmission signal processes, such as coding/modulation processes, a precoding process, a mapping process for resource elements, an OFDM modulation process and so on of the generated downlink signals. The transmitting antennas 102 transmit downlink signals input from the transmission signal processing section 101 by using the coverage carrier.

Also, the macro base station 10 has a receiving antenna 103, a received signal processing section 104, and a feedback information acquisition section 105 (acquisition section), and a position-related information estimation section 106 (reporting section), as processing sections of a receiving sequence. The receiving antenna 103 receives uplink signals (for example, the uplink data signal (PUSCH), the uplink control signal (PUCCH), the access signal (PRACH) and so on) transmitted from the user terminals 30 by using the coverage carrier. The received signal processing section 104 carries out received signal processes such as an OFDM demodulation process, a demodulation process, and a decoding process for the received signals from the receiving antenna 103.

The feedback information acquisition section 105 acquires feedback information from the user terminals 30 from the received signals subjected to the received signal processes in the received signal processing section 104. The feedback information includes, for example, information showing channel state of the coverage carrier in the macro cell C1 (for example, CSI (Channel State Information) such as CQI (Channel Quality Indicator), PMI (Precoding Matrix Indicator), RI (Rank Indicator) and so on). Also, the feedback information may include received quality (for example, SINR and so on) and path loss of the coverage carrier in the user terminals 30, or position information of the user terminals 30 (for example, the longitude and the latitude).

The position-related information estimation section 106 estimates position-related information of the user terminals 30 based on the feedback information acquired in the feedback information acquisition section 105. As described above, the position-related information of the user terminals 30 may be position information of the user terminals 30 (for example, the latitude and the longitude and so on), or may be information that can estimate the positions of the user terminals 30 such as distance information from the macro base station 10 to the user terminals 30, path loss of the coverage carrier, directions of transmitting/receiving beams of the coverage carrier (direction of departure (DOD), direction of arrival (DOA) and so on) or precoding weight for forming the transmission beam, transmission power and so on. The position-related information estimating section 106 reports estimated position-related information of the user terminals 30 to the small base stations 20 via a wire interface such as an X2 interface or a radio interface.

Note that the macro base station 10 may have a beam forming information generating section (a reporting section) (not shown in FIG. 14) that generates beam forming information for forming transmission beams directed from the small base stations 20 to the user terminals 30, based on the position-related information of the user terminals 30 estimated by the position-related information estimating section 106 and the position-related information of the small base stations 20. Here, the beam forming information may be the directions of the transmission beams (direction of departure (DOD), direction of arrival (DOA) and so on) mentioned above, or precoding weight for forming the transmission beam mentioned above, transmission power, path loss to the user terminal 30. The beam forming information generating section reports the generated beam forming information to the small base stations 20 via a wire interface such as an X2 interface or a radio interface.

Also, a configuration of the macro base station 10 shown in FIG. 14 is schematic, and is by no means limited to this. For example, the transmitting antennas 102 and the receiving antenna 103 are configured separately, but may be physically configured to be the same. Also, the macro base station 10 may certainly include a processor, a memory and so on not illustrated here.

Figure 15:
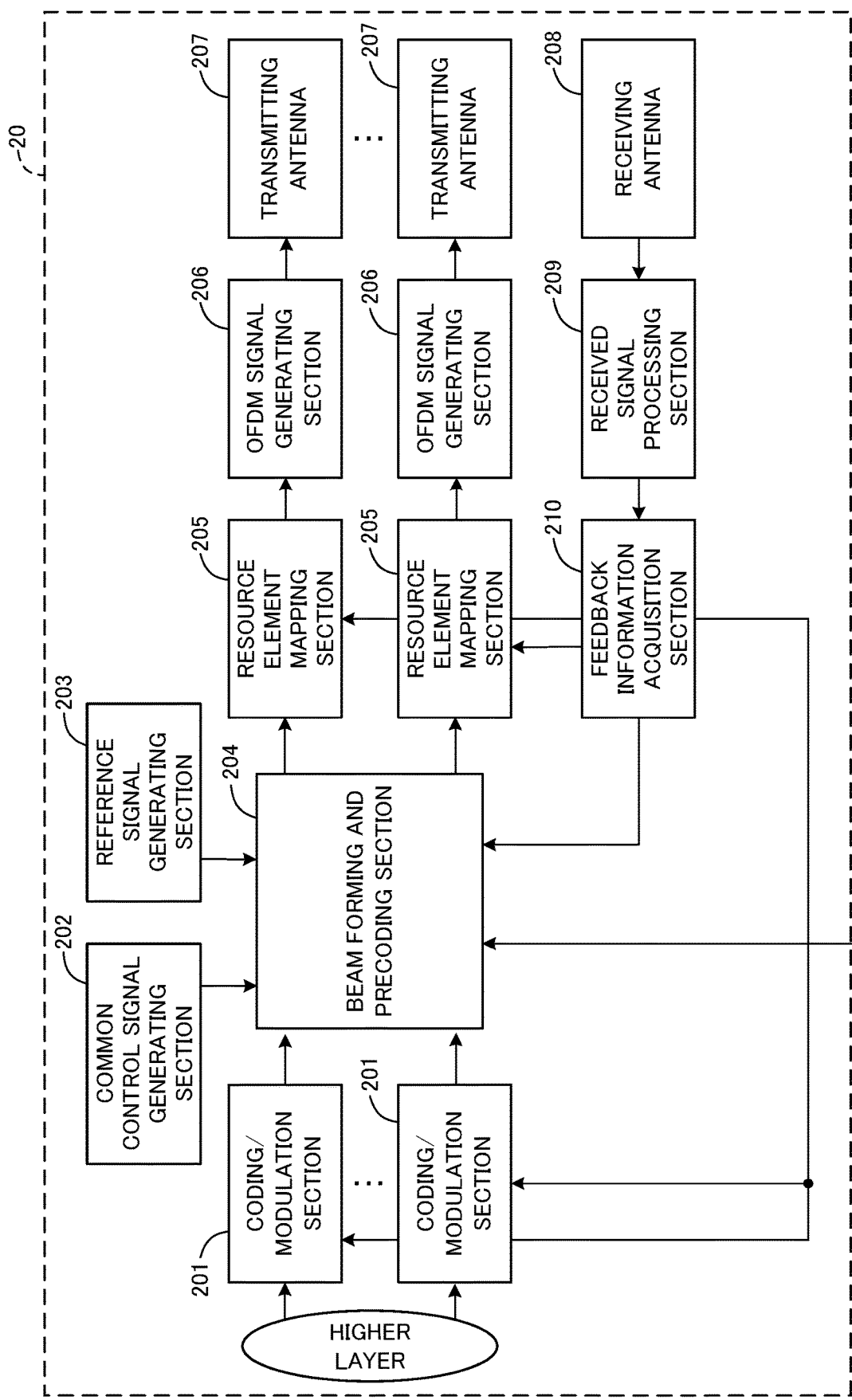
FIG. 15 is a configuration diagram to show an example of a small base station according to the present embodiment.

FIG. 15 is a schematic block diagram to show a detailed configuration of the small base station 20 according to the present embodiment. The small base station 20 has a plurality of coding/modulation sections 201, a common control signal generating section 202, a reference signal generating section 203, a beam forming and precoding section 204, a plurality of resource element mapping sections 205, a plurality of OFDM signal generating sections 206, and a plurality of transmitting antennas 207, as processing sections of a transmitting sequence.

The coding/modulation sections 201 carry out a coding process and a modulation process for transmission data input from a higher layer. To be more specific, coding/modulation sections 201 decide coding rate and modulation schemes base on feedback information (for example, CQI (Channel Quality Indicator)) acquired in a feedback information acquisition section 210, which will be described later. The coding/modulation sections 201, by using the decided coding rate and the modulation schemes, carry out a coding process and a modulation process for the transmission data to the user terminals 30 and output the result to the beam forming and precoding section 204. Note that, the transmission data input from the higher layer to the coding/modulation sections 201 may include not only user data for the user terminals 30 but may also include control data of the higher layer signaling such as RRC signaling.

The common control signal generating section 202 generates common control signals. Here, the common control signals refer to common control signals in a small cell S, and, for example, the discovery signal described in FIG. 7, the CCH (Common Control Channel) signal, the broadcast signal (BCH: Broadcast Channel), the synchronization signal and so on are generated. Note that the common control signal generating section 202 may carry out a coding process and a modulation process for the common control signals by using predetermined coding rate and modulation schemes. The common control signal generating section 202 outputs the generated common control signals to the beam forming and precoding section 204.

The reference signal generating section 203 generates reference signals. Here, as reference signals, for example, the demodulation reference signal (DM-RS) used for demodulation of the downlink data signal (PDSCH: Physical Data Shared Channel) in the user terminals 30, the measurement reference signal (CSI-RS: Channel State Information Reference Signal) used for a channel estimation in the user terminals 30, the cell-specific reference signal (CRS) and so on are generated. The reference signal generating section 203 outputs the generated reference signals to the beam forming and precoding section 204.

The beam forming and precoding section 204 generates beam forming information for forming transmission beams directed from the small base station 20 to the user terminals 30. To be more specific, based on the position-related information of the user terminals 30 received from the macro base station 10 and the position-related information of the small base station 20 (own station), the beam forming and precoding section 204 generates beam forming information for forming transmission beams to transmit the common control/reference signals (for example, directions of the transmission beams (direction of departure (DOD), direction of arrival (DOA) and so on), precoding weight, transmission power, path loss to the user terminals 30 and so on). The beam forming information may be reported from the macro base station 10 via a wire interface such as an X2 interface or a radio interface.

Note that the transmission beam to transmit the common control/reference signals may be a plurality of transmission beams having different transmission layers (antenna ports), may be a plurality of transmission beams allocated to different time resource units (for example, time slots, subframes and so on), or may be a plurality of transmission beams allocated to different frequency resource units (for example, resource blocks and so on). In this case, as shown in FIG. 8C, the beam forming and precoding section 204 may generate beam forming information for forming a plurality of transmission beams having different beam patterns (directivity, precoding weight) directed to the rough positions of the user terminals 30.

Also, the beam forming and precoding section 204 may generate beam forming information (for example, directions of the transmission beams, precoding weight or transmission power) for forming transmission beams of the user-specific downlink signals (for example, the downlink data signal (PDSCH), the enhanced downlink control signal (ePDCCH), the demodulation reference signal (DM-RS) and so on) based on feedback information (for example, PMI) output from a feedback information acquisition section 210, which will be described later.

Also the beam forming and precoding section 204 pre-encodes the data signal input from the coding/modulation sections 201, the common control signals input from the common control signals generating section 202, and the reference signals input from the reference signal generating section 203. To be more specific, the beam forming and precoding section 204 applies phase and/or amplitude shift (weighting of each transmitting antenna 207 by precoding) to each transmitting antenna 207 based on the beam forming information described above (for example, a direction of a transmission beam or precoding weight). Note that, the beam forming and precoding section 204 may precode according to the transmission layers (antenna ports). Also, the beam forming and precoding section 204 may decide transmission power per transmitting antenna 207 based on the beam forming information described above (for example, transmission power).

The resource element mapping sections 205 map transmission signals output from the beam forming and precoding section 204 to resource elements of the transmission layers (antenna ports). Note that the resource element mapping sections 205 may map reference signals that are not subjected to precoding among the reference signals generated in the reference signal generating section 203 to the resource elements according to predetermined mapping patterns.

The OFDM signal generating sections 206 convert the frequency domain transmission signals output by the resource element mapping sections 205 to time domain transmission signals through a frequency-time conversion process such as IFFT (Inverse Fast Fourier Transform) and so on. Furthermore, the OFDM signal generating sections 206 add guard intervals (cyclic prefixes) by cyclically expanding part of each OFDM symbol.

The transmitting antennas 207 carry out a conversion process from a baseband to radio frequency for the transmission signals input from the OFDM signal generating sections 206 and transmit those signals using a capacity carrier.

Also, the small base station 20 has a receiving antenna 208, a received signal processing section 209, and a feedback information acquisition section 210, as processing sections of a receiving sequence. The receiving antenna 208 receives uplink signals transmitted from the user terminals 30 by using the capacity carrier. The received signal processing section 209 carries out received signal processes such as an OFDM demodulation process, a demodulation process, a decoding process and so on for the received signals from the receiving antenna 208.

The feedback information acquisition section 210 acquires the feedback information from the user terminals 30 included in the received signals and outputs those signals to the beam forming and the precoding section 204 and the coding/modulation sections 201. The feedback information includes, for example, CSI (Channel State Information) such as CQI (Channel Quality Indicator), PMI (Precoding Matrix Indicator), RI (Rank Indicator), and so on.

Also, a configuration of the small base station 20 shown in FIG. 15 is schematic, and is by no means limited to this. For example, the transmitting antennas 207 and the receiving antenna 208 are configured separately, but may be physically configured to be the same. Also, the small base station 20 may certainly include a processor or a memory and so on not illustrated here.

Figure 16:
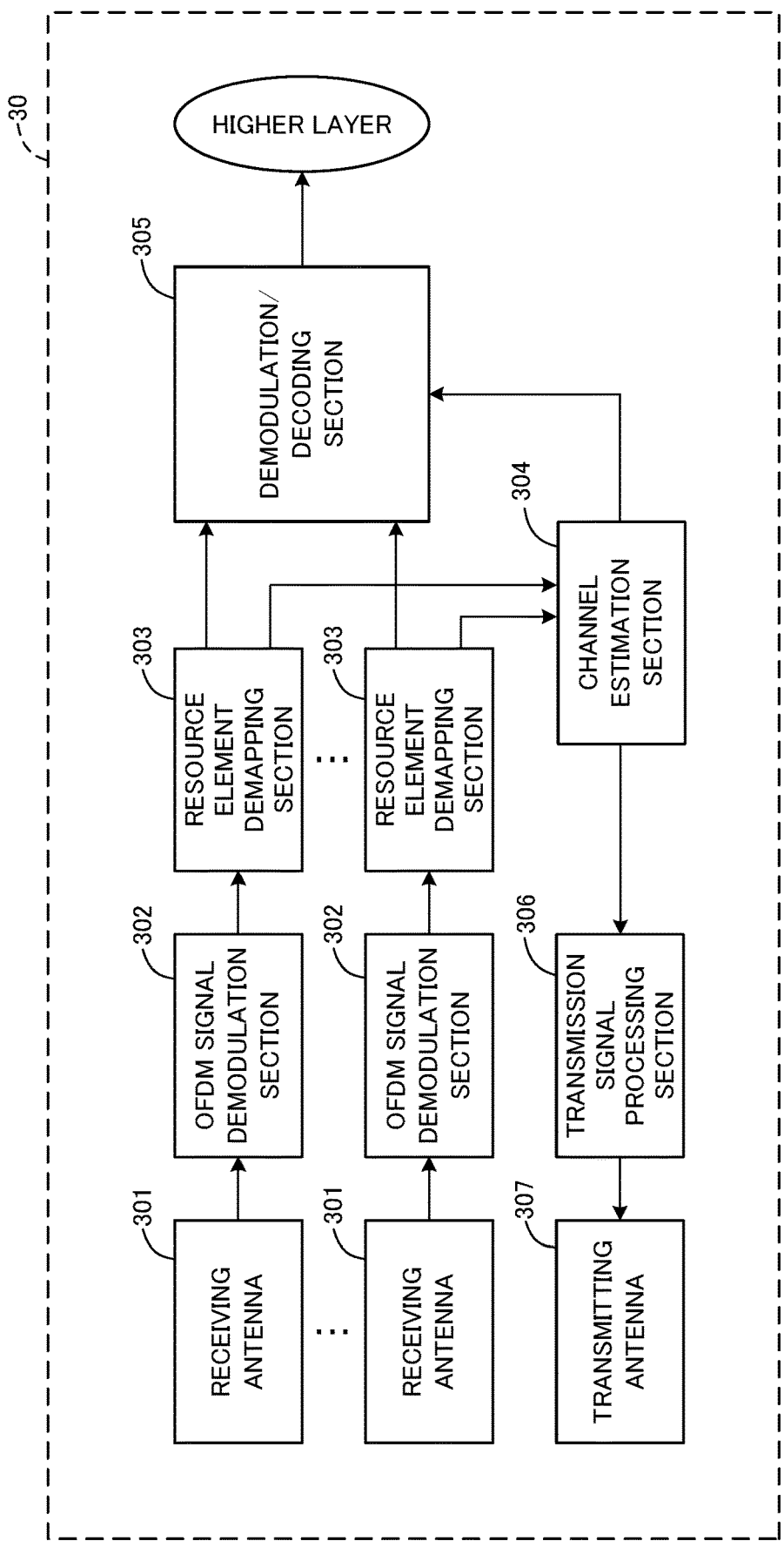
FIG. 16 is a configuration diagram to show an example of a user terminal according to the present embodiment.

FIG. 16 is a schematic block diagram to show a detailed configuration of the user terminal 30 according to the present embodiment. The user terminal 30 has a plurality of receiving antennas 301, a plurality of OFDM signal demodulation sections 302, a plurality of resource element demapping sections 303, a channel estimation section 304, a demodulation/decoding section 305 as processing sections of a receiving sequence, and a transmission signal processing section 306 and a transmitting antenna 307 as processing sections of a transmitting sequence.

The receiving antennas 301 receive downlink signals transmitted from the macro base station 10 by using a coverage carrier and downlink signals transmitted from the small base station 20 by using a capacity carrier. The receiving antennas 301 carry out, for example, a process to convert radio frequency to a baseband signal on the downlink signals from the macro base station 10 or the small base station 20.

The OFDM signal demodulation sections 302 remove the guard intervals added to the received signals from the receiving antennas 301, and convert those signals to frequency domain signals through time frequency conversion processes such as FFT (Fast Fourier Transform).

The resource element demapping sections 303 demap (separate) the signals mapped in the macro base station 10 or the small base station 20, and output the data signal to the demodulation/decoding section 305, and the measurement reference signal (CSI-RS) and the demodulation reference signal (DM-RS) to the channel estimation section 304. Also, the control signals are shared among all the user terminals 30 (including higher layers) and used for various controls such as data signal demodulation in the user terminals 30 (not shown).

The channel estimation section 304 estimates (channel estimation) the amplitude and phase variation in each resource element (frequency response, transfer function) for each layer (rank, space multiplexing) of each receiving antenna 301, based on the input demodulation reference signal (DM-RS). Note that with respect to resource elements in which the demodulation reference signals are not mapped, on the basis of resource elements in which the demodulation reference signals are mapped, the channel estimation value is interpolated in the frequency direction and the time direction and the channel is estimated. The channel estimation section 304 outputs the estimation result by the channel estimation to the demodulation/decoding section 305.

Also, the channel estimation section 304 measures channel state based on the input measurement reference signal (CSI-RS), and generates feedback information based on the measurement result. To be more specific, the channel estimation section 304 measures channel state of the receiving antenna 301 for each of a plurality of the transmitting antennas 102 or 207 by using the received measurement reference signal, and based on the measurement result, generates feedback information. Furthermore, the feedback information is reported to the macro base station 10 or the small base station 20 by using the uplink control signal (PUCCH) or the uplink data signal (PUCCH), and used for adaptive control in various processes.

The demodulation/decoding section 305 carries out a demodulation process and a decoding process of the data signal input from the resource element demapping sections 303 based on the channel estimation result input from the channel estimation section 304.

The transmission signal processing section 306 generates uplink signals including feedback information input from the channel estimation section 304, and carries out transmission signal processes such as a coding process, a modulation process, an OFDM modulation process and so on for the generated uplink signals.

The transmitting antenna 307 transmits uplink signals input from the transmission signal processing section 306 to the macro base station 10 by using a coverage carrier. On the other hand, the transmitting antenna 307 transmits uplink signals input from the transmission signal processing section 306 to the small base station 20 by using a capacity carrier.

Also, a configuration of the user terminal 30 shown in FIG. 16 is schematic, and is by no means limited to this. For example, the receiving antennas 301 and the transmitting antenna 307 are configured separately, but may be physically configured to be the same. Also, the user terminal 30 may certainly include a processor, a memory, an operating section and so on not illustrated here. Also, the processing sections of the receiving sequence of the coverage carrier from the macro base station 10 and the processing sections of the receiving sequence of the capacity carrier from the small base station 20 may be provided separately.

As described above, with the radio communication system 1 according to the present embodiment, a transmission beam of a capacity carrier is formed based on the position-related information of the user terminal 30 (that is, the (rough) position of the user terminal 30) estimated by communication using a coverage carrier of the macro base station 10 and the user terminal 30. Consequently, the small base station 20 does not form transmission beams in directions where there are no user terminals 30. As a result, it is possible to shorten the time the user terminal 30 takes to detect common control/reference signals while coverage of the common control/reference signals that are common in a small cell C2 is secured.

The present invention is by no means limited to the above embodiment and can be implemented in various modifications. For example, without departing from the scope of the present invention, it is possible to adequately change the number of carriers, the bandwidth of carriers, the signaling method, the type of the additional carrier type, the number of processing sections, and the order of processing steps in the above description, and implement the present invention. Besides, the present invention can be implemented with various changes, without departing from the scope of the present invention.

The invention claimed is:

1. A radio communication method, comprising:
   transmitting, from a user terminal and to a first radio base station that is connected to the user terminal, measurement information including information about a first beam;
   transmitting, from the first radio base station to a second radio base station, the information about the first beam;
   transmitting at least one signal of a synchronization signal and a reference signal from the second radio base station by using a second beam based on the information about the first beam; and
   when the user terminal receives the at least one signal of the synchronization signal and the reference signal from the second radio base station, performing connection processing between the user terminal and the second radio base station.

2. A user terminal, comprising:
   a transmitter that transmits, from the user terminal to a first radio base station that is connected to the user terminal, measurement information including information about a first beam, wherein the first radio base station transmits the measurement information to a second radio base station and the second radio base station transmits at least one signal of a synchronization signal and a reference signal by using a second beam based on the information about the first beam; and
   a processor that, when the user terminal receives the at least one signal of the synchronization signal and the reference signal from the second radio base station, performs connection processing between the user terminal and the second radio base station.

* * * * *